United States Patent
McDiffett et al.

(10) Patent No.: US 12,497,753 B2
(45) Date of Patent: Dec. 16, 2025

(54) METHOD AND SYSTEM FOR OPERATING MOTOR GRADERS

(71) Applicant: Caterpillar Inc., Peoria, IL (US)

(72) Inventors: Jody McDiffett, Wamego, KS (US); Michael C. Gentle, Maroa, IL (US); Ethan Tevis, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 69 days.

(21) Appl. No.: 18/638,837

(22) Filed: Apr. 18, 2024

(65) Prior Publication Data
US 2025/0327271 A1   Oct. 23, 2025

(51) Int. Cl.
*E02F 3/84* (2006.01)
*E02F 9/26* (2006.01)

(52) U.S. Cl.
CPC . *E02F 3/84* (2013.01); *E02F 9/26* (2013.01)

(58) Field of Classification Search
None
See application file for complete search history.

(56) References Cited

U.S. PATENT DOCUMENTS

| | | |
|---|---|---|
| 9,404,464 B2 | 8/2016 | Hull et al. |
| 9,701,312 B2 | 7/2017 | Jensen et al. |
| 10,114,370 B2 | 10/2018 | Nelson et al. |
| 10,400,425 B2 | 9/2019 | Horstman et al. |
| 10,451,019 B2 | 10/2019 | Johnson et al. |
| 11,459,725 B2 | 10/2022 | Gentle et al. |
| 11,505,913 B2 | 11/2022 | Gentle et al. |
| 2020/0048865 A1 | 2/2020 | Dauth et al. |

FOREIGN PATENT DOCUMENTS

WO   2014182879 A1   11/2014

*Primary Examiner* — Abdhesh K Jha (57) ABSTRACT

A method to shut down a motor grader is disclosed. The method comprises obtaining information that indicates the motor grader is to be shutdown. The method further includes causing a parking brake of the motor grader to be in a braked position, and a transmission of the motor grader to be in a neutral position. The method further includes causing an implement to be moved to a grounded position when the implement is not in the grounded position. The method further includes at least one of causing, via a controller, the motor grader to be shutdown, or causing, via the controller, an alert to be provided, wherein the alert includes information that, to complete the shutdown of the motor grader, the parking brake is to be in the braked position, the transmission is to be in the neutral position, and the implement is to be moved to the grounded position.

20 Claims, 7 Drawing Sheets

METHOD AND SYSTEM FOR OPERATING MOTOR GRADERS

TECHNICAL FIELD

The present disclosure relates to a mobile work machine, such as a motor grader. More particularly, the present disclosure relates to a method and a system for shutting down the motor grader.

BACKGROUND

A mobile work machine, such as a motor grader, generally includes multiple devices, such as traction devices, implements, e.g., blades, rippers, and the like. Further, a mobile work machine may also include a power system to power operations of such devices. At the end of a work cycle or an operation of a mobile work machine, one or more systems of the mobile work machine, e.g., a power system of the mobile work machine, is typically powered off or is shut down. A failure to move one or more of such devices to an appropriate state may result in a less than a desirable condition for the mobile work machine. For example, a failure to apply brakes to the traction devices may cause the mobile work machine to move or roll away from a parked location over a period, a failure to properly position an implement may cause the implement to interfere with the surrounding environment. Such failures decrease an overall life and usability of the mobile work machine.

U.S. Pat. No. 9,701,312 discloses an idle reduction engine shutdown and restart system for a machine. The machine includes an engine operably connected to a drivetrain including ground engaging propulsion members. The idle reduction engine shutdown and restart system includes an idle reduction engine shutdown and restart controller electronically and controllably connected to the engine and configured to shut down the engine in an engine shutdown mode.

SUMMARY

In an embodiment, the present disclosure relates to a method to shutdown a motor grader. The method includes obtaining information that indicates the motor grader is to be shutdown. The method further includes causing, based on the indication that the motor grader is to be shutdown, a parking brake of the motor grader to be in a braked position. Further, the method includes causing, based on the indication that the motor grader is to be shutdown, a transmission of the motor grader to be in a neutral position. Also, the method includes detecting, based on information from one or more sensors of the motor grader, whether an implement, of one or more ground engaging implements of the motor grader, is not in a grounded position. In addition, the method includes causing, based on detecting that the implement is not in the grounded position and based on the indication that the motor grader is to be shutdown, the implement to be moved to the grounded position. Further, the method includes at least one of: (a) causing, via a controller of the motor grader and based on the parking brake being in the braked position, the transmission being in the neutral position, and the implement being in the grounded position, the motor grader to be shutdown; or (b) causing, via the controller of the motor grader and based on the indication that the motor grader is to be shutdown, an alert to be provided in an operator cab of the motor grader, wherein the alert includes information that, to complete the shutdown of the motor grader, the parking brake is to be in the braked position, the transmission is to be in the neutral position; and the implement is to be moved to the grounded position.

In another embodiment, the present disclosure relates to a system for shutting down a motor grader. The system includes one or more sensors and a controller. The one or more sensors provide information on whether an implement of one or more ground engaging implements of the motor grader is not in a grounded position. The implement is movable to the grounded position based on an indication that the motor grader is to be shutdown and based on detecting that the implement is not in the grounded position, and based on the indication that the motor grader is to be shutdown, a parking brake of the motor grader is movable to a braked position and a transmission of the motor grader is movable to a neutral position. The controller is configured to at least one of: (a) cause, based on the parking brake being in the braked position, the transmission being in the neutral position, and the implement being in the grounded position, the motor grader to be shutdown; or (b) cause, based on the indication that the motor grader is to be shutdown, an alert to be provided in an operator cab of the motor grader, wherein the alert includes information that, to complete the shutdown of the motor grader, the parking brake is to be in the braked position, the transmission is to be in the neutral position; and the implement is to be moved to the grounded position.

In yet another embodiment, the present disclosure relates to a method for shutting down a power system of a mobile work machine. The method includes receiving, by a controller, an input to shut down the power system. The method further includes shifting, by the controller, a parking brake and/or a transmission of the mobile work machine from a first state to a second state in response to the input to halt a movement of the mobile work machine with respect to an underlying ground surface. Further, the method includes detecting, by one or more sensors, an orientation of an implement, of one or more ground engaging implements of the mobile work machine in response to the input. Furthermore, the method includes determining, by the controller, the orientation to correspond to an operational position of the implement, of the one or more ground engaging implements when the orientation violates an orientation condition. Also, the method includes issuing, by the controller, one or more instructions to switch the orientation of the implement, of the one or more ground engaging implements from the operational position to a grounded position. In addition, the method includes generating, by the controller, a command to move the power system from an active state to an inactive state to shut down the power system upon the parking brake and/or the transmission attaining the second state and upon the orientation of the implement, of the one or more ground engaging implements attaining the grounded position.

BRIEF DESCRIPTION

DETAILED DESCRIPTION

Reference will now be made in detail to specific embodiments or features, examples of which are illustrated in the accompanying drawings. Wherever possible, the same reference numbers will be used throughout the drawings to refer to the same or the like parts.

Figure 1:
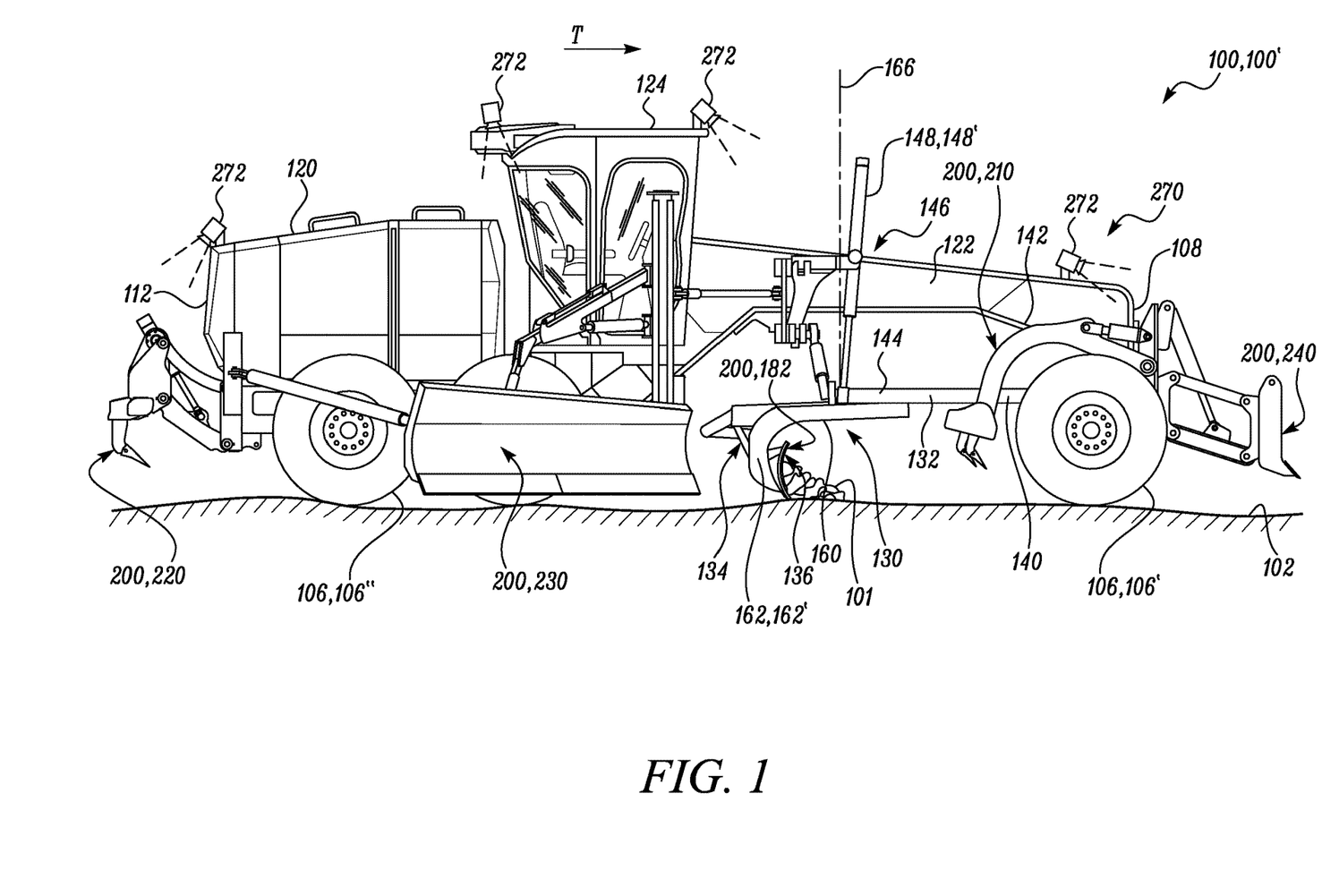
FIG. 1 is a side view of an exemplary motor grader, according to an embodiment of the present disclosure.

Referring to FIG. 1, a mobile work machine 100 such as a motor grader 100' is shown. The motor grader 100' may be used to displace, spread, distribute, level, and grade materials 101, such as soil, over an underlying ground surface 102. Generally, a grading operation is performed during machine movement, and for this purpose, the motor grader 100' may include traction devices, that facilitate movement over the underlying ground surface 102. For example, the traction devices include a set of wheels 106 (e.g., front wheels 106' disposed towards a front end 108 of the motor grader 100' and rear wheels 106" disposed towards a rear end 112 of the motor grader 100). The terms 'front' and 'rear', as used herein, are in relation to a direction of travel of the motor grader 100', as represented by arrow, T, in FIG. 1, with said direction of travel being exemplarily defined from the rear end 112 towards the front end 108. A movement of the traction devices (i.e. a rotation of the set of front wheels 106' and set of rear wheels 106") may be powered by a power system 104, such as an engine (not shown), housed in a power compartment 120 of the motor grader 100'. The power system 104 may provide motive power to the motor grader 100'. Further, the motor grader 100' may include a frame 122, and at least one ground engaging implement 200. Further, the motor grader 100' may include an operator cab 124 that houses controls of the power source and the at least one ground engaging implement 200 of the motor grader 100', supported on the frame 122.

To grade and level materials 101, the motor grader 100' may include a drawbar-circle-blade (DCB) arrangement 130, also referred to as a grader group 130. The grader group 130 may be supported by the frame 122. The grader group 130 may include a drawbar 132, a circle assembly 134, and a blade assembly 136, each of which may function in concert to perform a grading operation on the underlying ground surface 102.

The drawbar 132 may include a first end 140 pivotally coupled to a front end 142 of the frame 122 and a second end 144 movably supported by another portion (such as a mid-portion 146) of the frame 122. For example, the second end 144 of the drawbar 132 may be coupled to the mid-portion 146 of the frame 122 via one or more actuators 148, such as a hydraulic actuator 148. The hydraulic actuator 148 may be actuated to raise or lower the second end 144 of the drawbar 132 with respect to the frame 122, in turn, allowing the grader group 130 to be raised or lowered relative to the underlying ground surface 102.

The circle assembly 134 includes a circle member 160 and a pair of arms 162. The circle member 160 rotates relative to the drawbar 132 about a rotation axis 166 that passes through a center of the circle member 160. Further, the pair of arms 162 may extend from the circle member 160 and may rotate with a rotation of the circle member 160, relative to the drawbar 132. It may be noted that only one arm 162' is shown since the other of the pair of arms 162 is hidden behind arm 162' in the orientation of the grader group 130 provided in FIG. 1. Each of the pair of arms 162 may be diametrically opposed and spaced apart from the other, and extends from an outer surface of the circle member 160 in an axial direction (such as along the rotation axis 166) to define a lower end away from the circle member 160.

Figure 2:
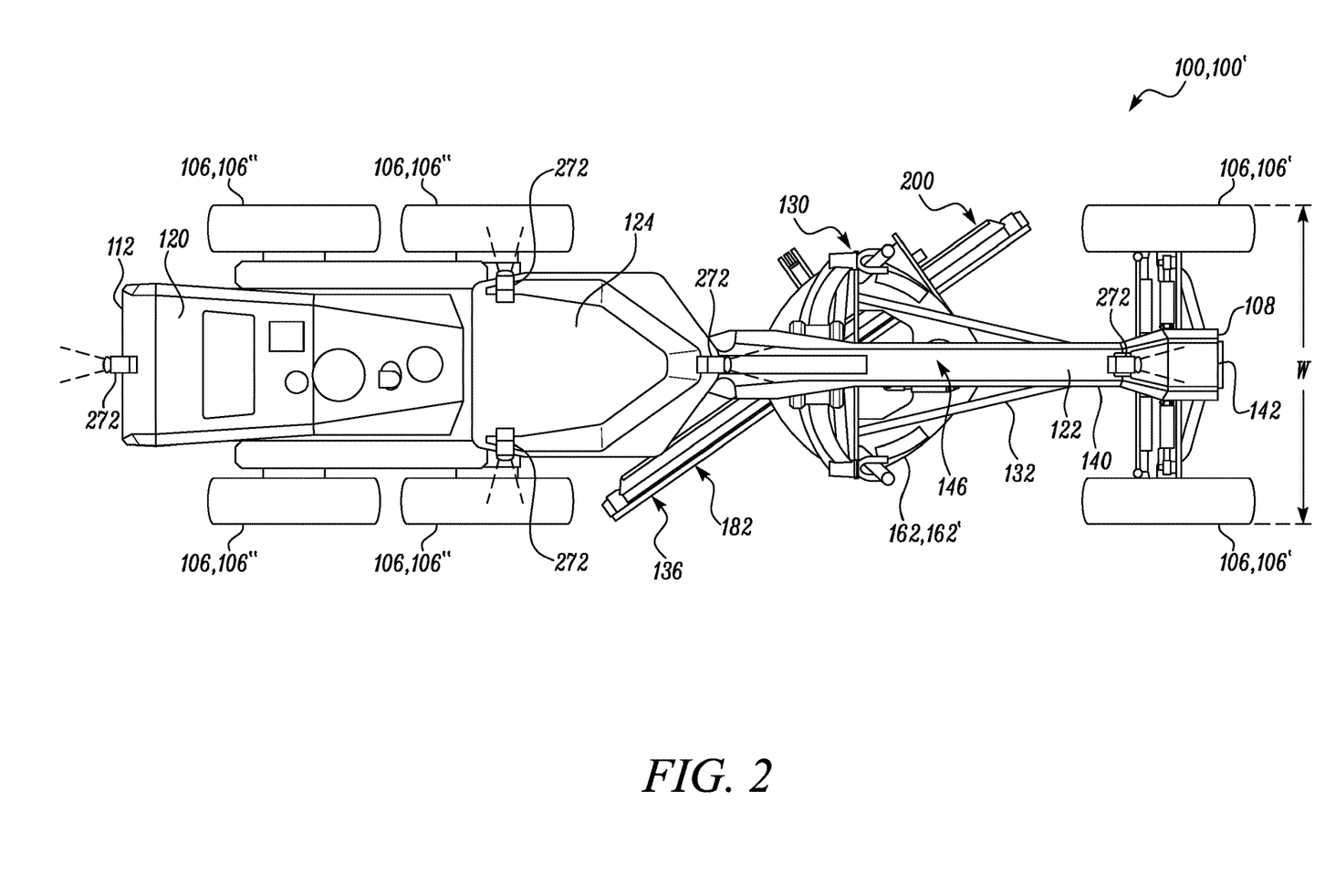
FIG. 2 is a top view of the exemplary motor grader of FIG. 1 including the blade in a tucked-in position, and devoid of a mid-mount scarifier, a ripper, a snow wing, and a front attachment, according to an embodiment of the present disclosure.

Referring to FIGS. 1 and 2, the blade assembly 136 is discussed. The blade assembly 136 is supported by the pair of arms 162, and includes a blade 182 (ground engaging implement 200). The blade 182 (which is also sometimes referred to as a moldboard) may be adapted to engage the material (e.g., the material 101) over the underlying ground surface 102, and grade and level the underlying ground surface 102 (see FIG. 1). The blade 182 may be contoured to have a concave shape, as shown in FIG. 1. A front face of the blade 182 is directed towards the front end 108 of the motor grader 100', so that the blade 182 may receive, alter, and grade the material, during a travel of the motor grader 100' along direction, T. The blade 182 may include a variety of other shapes, such as a planar shape.

The blade 182 may be moved to attain various orientations relative to the underlying ground surface 102. In one example, the orientation may correspond to an operational position of the ground engaging implement 200 (e.g., the blade 182). In another example, the orientation may correspond to a grounded position of the ground engaging implement (e.g., the blade 182). In an exemplary embodiment, as shown in FIG. 1, to attain various orientations, the blade 182 may be raised or lowered relative to the underlying ground surface 102 by correspondingly raising or lowering the second end 144 of the drawbar 132 relative to the frame 122, for example, by actuating (or moving) the hydraulic actuator 148. Also, the blade 182 may be rotated about the rotation axis 166 as the circle member 160 may be rotated about the rotation axis 166, for example, by a motor (not shown) of the motor grader 100. A variety of other orientations of the blade 182, including tilting of the blade 182, such as about a longitudinal axis (extending from the rear end 112 towards the front end 108) of the motor grader 100' is also possible.

Further, the ground engaging implement 200 may include, but not limited to, a mid-mount scarifier 210, a ripper 220, a snow wing 230, and a front attachment 240, such as a blade, a plow, or a broom. The power system 104 may provide power to the ground engaging implement 200 to alter the underlying ground surface 102 during a motion of the motor grader 100'. The ground engaging implement 200 is configured to move to the grounded position from the operational position when the motor grader 100' needs to be shut down.

The motor grader 100' further includes at least one sub-system 250 configured to operate the motor grader 100'. The sub-system 250 may include components including, but not limited to, transmission 254, parking brake 258, steering 262 and the like. The transmission 254 may be any type of transmission, including but not limited to, a mechanical transmission, hydraulic transmission, manual transmission, automatic transmission, and the like. The transmission 254 may be operable to produce multiple output speed ratios (or a continuously variable speed ratio) between the power system 104 and the wheels 106 of the motor grader. The transmission 254 of the motor grader 100' is movable between a neutral position and a gear-engaging position. The steering 262 may be any type of steering, including but not limited to, a hydraulic steering, electric steering, and the like. The parking brake 258 may include any type of brake, including but not limited to, a hydraulic brake, electric brake, drum brake, and the like. The parking brake 258 of the motor grader 100' is movable to a braked position when the motor grader 100' is parked. In such a scenario, the parking brake 258 is configured to stop a rotation of the wheels 106.

The motor grader 100' further includes an obstacle detection module 270 configured to detect the presence of any obstacle or personnel around the motor grader 100'. The obstacle detection module 270 may include one or more optical sensors such as, but not limited to, cameras 272, radar, lidar, disposed on the motor grader 100'. For example, one or more cameras 272 may be disposed on the front end 108 and rear end 112 of the motor grader configured to detect the presence of any obstacle or personnel in front and/or rear of the motor grader 100'. Similarly, one or more cameras 272 may be disposed on a top of the operator cab 124 configured to detect the presence of any obstacle or personnel in left or right side of the motor grader 100'. In some embodiments, the cameras 272 may be configured to detect a position and/or orientation of the ground engaging implement 200.

Figure 3:
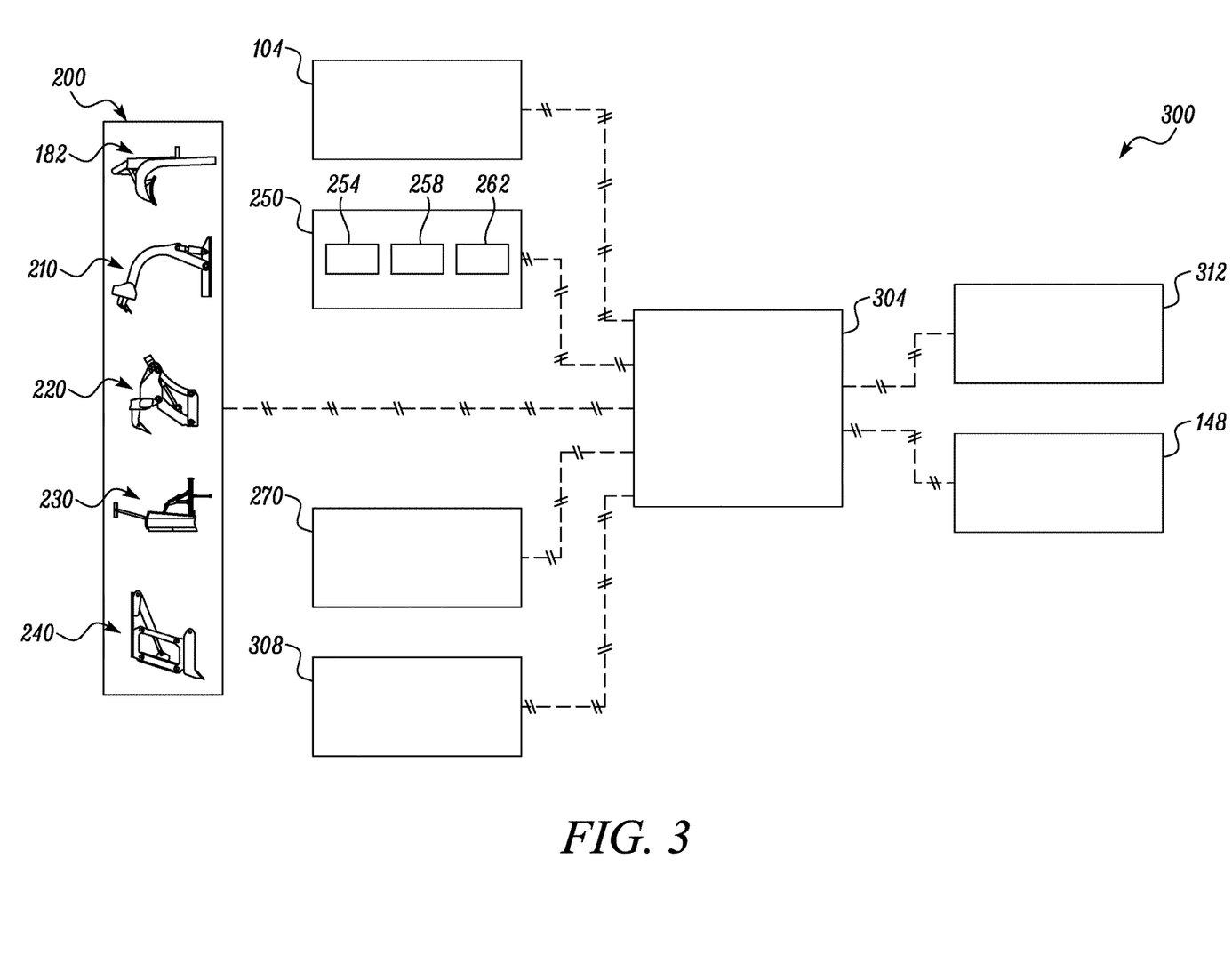
FIG. 3 is a schematic view of a system for the exemplary motor grader of FIG. 1, according to an embodiment of the present disclosure.

Referring now to FIG. 3, a system 300 for shutting down the motor grader 100' is now discussed. The system 300 is configured to shut down the power system 104 of the motor grader 100. The system 300 includes one or more sensors 308 (associated with the motor grader 100') and a controller 304 in communication with the one or more sensors 308. Each of these sensors 308 and the controller 304 is now discussed in detail.

The sensors 308 may be configured to detect an orientation of the ground engaging implement 200 (or 200') of the motor grader 100'. Examples of the sensors 308 may include, but not limited to, a blade sideshift sensor, a blade pitch sensor, a left blade lift sensor, a right blade lift sensor, a circle rotation sensor, a drawbar centershift sensor, an articulation sensor, a snow wing sensor, a front attachment sensor, a ripper sensor, a mid-mount scarifier sensor, and the like. In an example, the articulation sensor may be coupled to the frame 122 to measure an articulation between the front end 108 and the rear end 112 of the frame 122. In another example, the left blade lift sensor and the right blade lift sensor may be respectively coupled to a left lift cylinder and a right lift cylinder (of the motor grader 100') and are configured to measure a blade tilt. In addition, the motor grader 100' (or the mobile work machine 100) may include a pitch sensor for detecting a pitch of the motor grader 100".

The controller 304 may be in communication with the one or more actuators 148 associated with the motor grader 100'. The actuators 148 discussed herein may include, but not limited to, hydraulic cylinders, electrical actuators, and the like. In an exemplary embodiment, as shown in FIG. 1, the actuators 148 may include the hydraulic cylinder 148. Other examples of the actuators 148 may include, but not limited to, a blade sideshift actuator, a blade pitch actuator, a circle rotation actuator, a drawbar centershift actuator, an articulation actuator, a snow wing actuator(s), a front attachment actuator(s), a ripper actuator, a mid-mount scarifier actuator, and the like. The left and right blade lift actuators may control the positions of left and right lift cylinder, and thus control an angle of the blade 182.

Further, the controller 304 may be in communication with the output device 312. Examples of the output device 312 may include, but not limited to, a user interface display device, a sound output device, a haptic feedback device, and the like. The output device 312 may be mounted within the operator cab 124, and may be used to operate or monitor operating status of the motor grader 100' or its ground engaging implements 200.

The controller 304 is configured to receive an input to shut down the motor grader 100', for example, from an operator of the motor grader 100. In example, the controller 304 may receive the input in response to actuating (by the operator) an ignition button/switch (of the motor grader 100') to its OFF position to shut down the power system 104 of the motor grader 100'. In response to the input to shut down the motor grader 100', the controller 304 is configured to shift the parking brake 258 from its first state (inactive and/or disengaged state) to its second state (active and/or engaged state). In addition, the controller 304 also shifts the transmission 254 from its first state (any selected gear) to its second state (neutral gear). The controller 304 shifts the parking brake 258 and the transmission 254 to their corresponding second states to halt the movement of the motor grader 100' with respect to the underlying ground surface 102. Additionally, in some embodiments, the controller 304 may be configured to change the steering angle of the steering wheel upon receipt of the input to shut down the motor grader 100.

Further, the controller 304 is configured to determine the orientation of the ground engaging implement 200 (e.g., the blade 182). In an example, the controller 304 may receive data associated with the orientation of the ground engaging implement 200, from the sensors 308. The controller 304 may process the data pertaining to the orientation of the ground engaging implement 200 to determine if the orientation of the ground engaging implement 200 corresponds to the operational position of the ground engaging implement 200 or to the grounded position of the implement 200. In an example, the controller 304 may determine that the orientation of the ground engaging implement 200 corresponds to the operational position of the ground engaging implement 200 when the orientation violates an orientation condition. The orientation condition may correspond to a state of the ground engaging implement 200 in which the mobile work machine 100' (e.g., the motor grader 100') can be safely parked.

Upon determination of the orientation corresponding to the operational position of the ground engaging implement 200, the controller 304 is configured to issue one or more instructions to switch the orientation of the ground engaging implement 200 from the operational position to the grounded position. For that, the controller 304 may control (e.g., actuate) one or more of the actuators 148 (e.g., the hydraulic cylinder 148) to switch the orientation of the ground engaging implement 200 from the operational position to the grounded position. In an example, the controller 304 may actuate the actuators 148 in a manner such that the ground engaging implement 200 occupies a position (e.g., a tucked-in position, as shown in FIG. 2) within a width 'W' defined by the frame 122 of the motor grader 100'. Additionally, in some embodiments, the controller 304 may control the actuators 148 to lower the ground engaging implement 200 towards the underlying ground surface 102 and move the ground engaging implement 200 to its grounded position.

Further, in some embodiments, in response to the issuance of the one or more instructions, the controller 304 is configured to use the output device 312 to provide a first alert to the operator. For example, in case of the motor grader 100 is a manually controlled machine, the controller 304 may provide the first alert to indicate or direct (e.g., via a sound signal, or a display information) the operator to switch the orientation of the ground engaging implement 200 from the operational position to the grounded position such that the motor grader 100' can be parked safely.

Once the parking brake 258 and/or the transmission 254 are at their corresponding second states and the implement 200 is moved to its grounded position, the controller 304 is configured to generate a command to move the power system 104 from its active state to its inactive state to shut down the power system 104. In an example, the controller 304 may move the power system 104 from its active state to its inactive state by issuing a command to disconnect a battery of the power system 104 from one or more power units of the motor grader 100'. In another example, the controller 304 may issue a command (for example, to a control module associated with the power system 104) to cut-off a supply of fuel to the power system 104, to bring the power system 104 to its inactive state.

Further, in some embodiments, the controller 304 may be configured to use the output device 312 to provide a second alert in response to the command. For example, in case of the motor grader 100' is a manually controlled machine, the controller 304 may provide the second alert to indicate or direct (e.g., via a sound signal, or a display information) the operator to move the power system 104 from the active state to the inactive state to shut down the power system 104.

Additionally, in some embodiments, the controller 304 may be configured to determine a pitch of the motor grader 100, for example, by receiving one or more signals indicative of the pitch of the motor grader 100', from the pitch sensor associated with the motor grader 100'. The controller 304 may issue one or more instructions to chock at least one of the wheels 106, 106" (of the motor grader 100') if the pitch of the motor grader 100' exceeds a pitch threshold. For example, chocking at least one of the wheels 106, 106 is intended to prevent the wheels 106, 106" from rotating while the motor grader 100' is parked and to thereby prevent the motor grader 100' from moving accidentally. For example, if the pitch or slope of the motor grader 100 is greater than a certain angle, the wheels 106, 106" of the motor grader 100' needs to be chocked to avoid the motion of the motor grader 100' while parked. In such a scenario, the controller 304 may issue the instruction to chock the wheels 106 of the motor grader 100' to avoid any accident.

Moreover, in some embodiments, the controller 304 may be configured to detect one or more obstacles around the motor grader 100 by using the cameras 272 (of the obstacle detection module 270) placed on the motor grader 100. The controller 304 may issue alerts in response to the detection of the one or more obstacles prior to generating the command to bring the power system 104 to its inactive state and prior to issuing the one or more instructions to move the ground engaging implement 200 to its grounded position. For example, upon detection of an obstacle around the motor grader 100', the controller 304 may issue an alert (e.g., via the output device 312), for the operator, indicating the obstacle to be removed before the ground engaging implement 200 is moved to its grounded position and the power system 104 is moved to its inactive state to safely shutdown and park the motor grader 100' (or the mobile work machine 100).

INDUSTRIAL APPLICABILITY

At an end of a work cycle or an operation of the mobile work machine 100 (e.g., the motor grader 100'), one or more systems of the mobile work machine 100, e.g., the power system 104, is typically powered off or is shut down. A failure to move one or more of such devices, such as the transmission 254, the parking brake 258, and the ground engaging implements 200, to their corresponding appropriate state may result in a less than a desirable condition for the mobile work machine 100, for example, during a restart of the mobile work machine 100 for another work cycle or operation. For example, a failure to apply parking brakes to the wheels 106, 106" may cause the mobile work machine 100 to move or roll away from a parked location over a period, a failure to properly position the ground engaging implement 200 to its tucked-in position (as shown in FIG. 2) may cause the implement 200 to interfere with the surrounding environment and may cause collision of the mobile work machine 100 with the other machines closely passing through the mobile work machine 100. Such failures may decrease an overall life and usability of the mobile work machine 100. To safely move the parking brake 258 to its engaged position, to shift the transmission 254 to neutral, and to move the ground engaging implements 200 to their corresponding grounded positions prior to initiate shutdown of the power system 104 (and/or the mobile work machine 100), the present disclosure provides the system 300.

Figure 4:
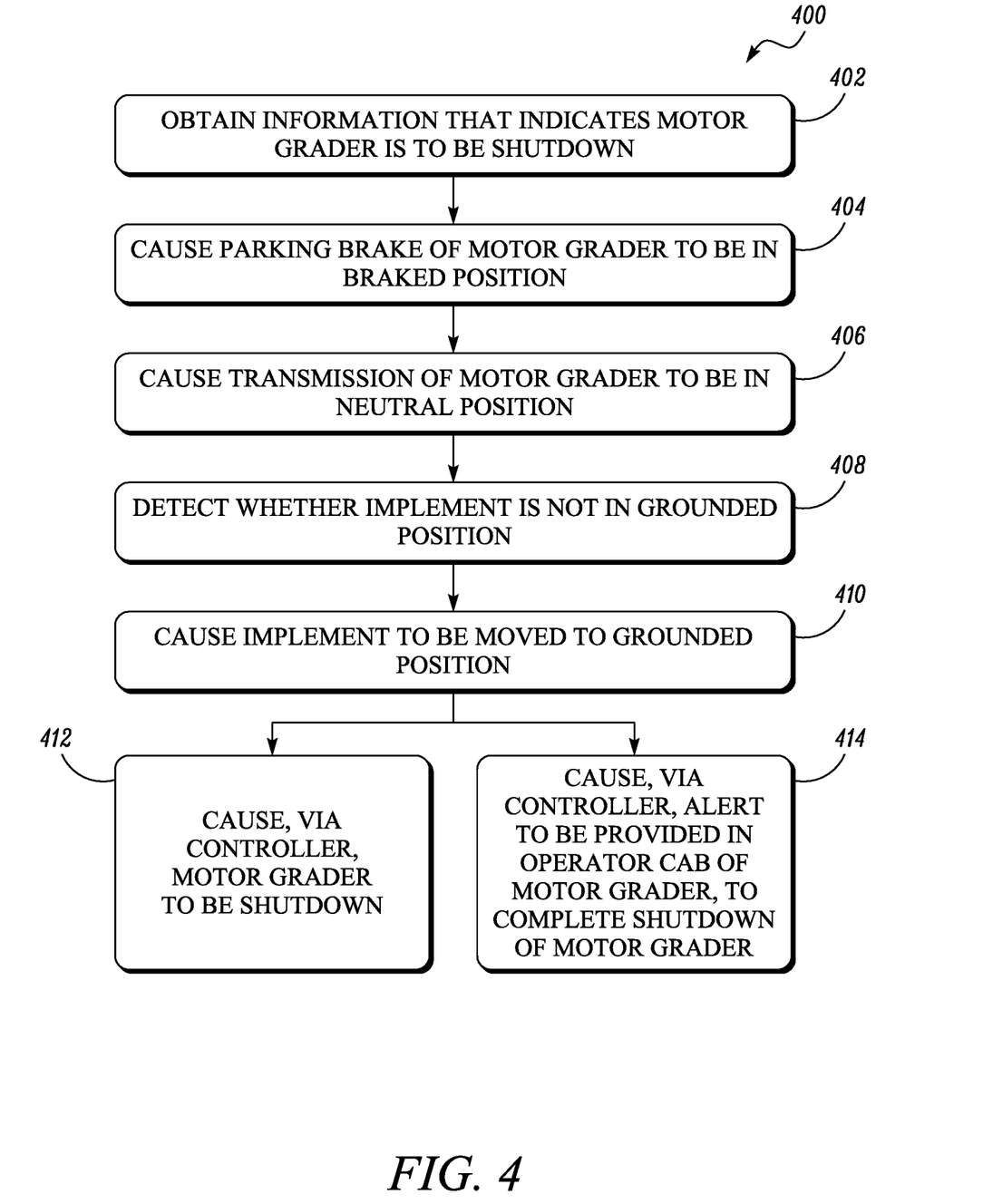
FIG. 4 is a flow chart depicting an exemplary method for operating exemplary motor grader of FIG. 1, in accordance with an embodiment of the present disclosure.

Referring to FIG. 4, an exemplary method to shut down the motor grader 100', via using the system 300, is discussed. The method 400 is discussed by way of a flowchart 400 that illustrates exemplary stages (i.e., from 402 to 414) associated with the method. The method is also discussed in conjunction with FIGS. 1, 2, and 3. It will be appreciated that the order of steps described in the method is exemplary in nature and that the steps can be performed in a different order than what is set out below, as will be contemplated by a person skilled in the art based on the description of the present disclosure.

The method begins with obtaining information that indicates the motor grader is to be shutdown, at block 402. The indication that the motor grader 100' is to be shutdown may correspond to the operator turning an ignition button/switch to the OFF position to shut down the power system 104. At block 404, the method includes causing the parking brake 258 of the motor grader 100' to be in a braked position, based on the indication that the motor grader 100' is to be shutdown. In some embodiments, the method includes determining whether the parking brake 258 is in the braked position or not based on information from the sensors 308. The method further includes causing, via the controller, the parking brake 258 to be moved to the braked position based on the indication that the motor grader 100" is to be shutdown and when the parking brake 258 is not in the braked position.

At block 406, the method includes causing the transmission 254 of the motor grader 100' to be in a neutral position, based on the indication that the motor grader 100' is to be shutdown. In some embodiments, the method includes determining whether the transmission 254 is in the neutral position based on information from the sensors 308. The method further includes causing, via the controller 304 the transmission 254 to be shifted to the neutral position based on the indication that the motor grader 100' is to be shutdown and when the transmission 254 is not in the neutral position.

At block 408, the method includes detecting whether the ground engaging implement 200 of the motor grader 100' is not in the grounded position, based on information from the sensors 308 of the motor grader 100'. At block 410, the method includes causing the ground engaging implement 200 to be moved to the grounded position based on the indication that the motor grader 100' is to be shutdown when the ground engaging implement 200 is not in the grounded position. In some embodiments, the method includes causing the ground engaging implement 200 to be moved to the grounded position by using the actuators 148 the controller 304. In some embodiments, the method includes moving, via the controller 304, the ground engaging implement 200 to the grounded position such that the ground engaging implement 200 (e.g., the blade 182) occupies a position (e.g., tucked-in position, as shown in FIG. 2) within the width 'W' defined by the frame 122 of the motor grader 100'. In some embodiments, the method includes lowering, via the controller 304, the ground engaging implement 200 towards the underlying ground surface 102 to move the ground engaging implement 200 to its corresponding grounded position.

Further the method, at block 412, includes causing the motor grader 100 to be shutdown, via the controller 304, when the parking brake 258 is in the braked position, the transmission 254 is in the neutral position, and the ground engaging implement 200 is in the grounded position. The controller 304 may cause the motor grader 100' to shut down by moving the power system 104 of the motor grader 100 from an active state to an inactive state. For that, the controller 304 may raise a command to disconnect a battery of the power system 104 from one or more power units of the motor grader 100.

Alternatively, the method proceeds to block 414. At block 414, the method includes causing an alert to be provided in the operator cab 124, via the controller 304 and based on the indication that the motor grader 100' is to be shutdown. The alert includes information pertaining to the completion of the shutdown of the motor grader 100 such as—the parking brake 258 is to be in the braked position, the transmission 254 is to be in the neutral position, and the ground engaging implement 200 is to be moved to the grounded position. In some embodiments, the alert may be provided in the operator cab 124 of the motor grader 100.

In some embodiments, the method includes determining whether the parking brake 258 is in the braked position or not based on information from the sensors 308. In such a scenario, the alert includes information that the parking brake 258 needs to be moved to the braked position when the parking brake 258 is not in the braked position. In some embodiments, the method includes determining whether the transmission 254 is in the neutral position or not based on information from the sensors 308. In such a scenario, the alert includes information that the transmission 254 needs to be moved to the neutral position when the transmission 254 is not in the neutral position. In some embodiments, the method includes determining a pitch of the motor grader based on information from the pitch sensor. In such a scenario, the alert includes information that one or more wheels 106, 106" of the motor grader 100' need to be choked when the pitch exceeds a pitch threshold. In some embodiments, the method further includes detecting one or more obstacles around the motor grader 100', based on information from the sensors 308. In such a scenario, the alert includes information that the obstacles around the motor grader 100' need to be removed when the obstacles are detected around the motor grader 100. In some embodiments, the method may include providing an alert and require the operator to acknowledge/accept that no obstacle is present around the motor grader 100.

Figure 5:
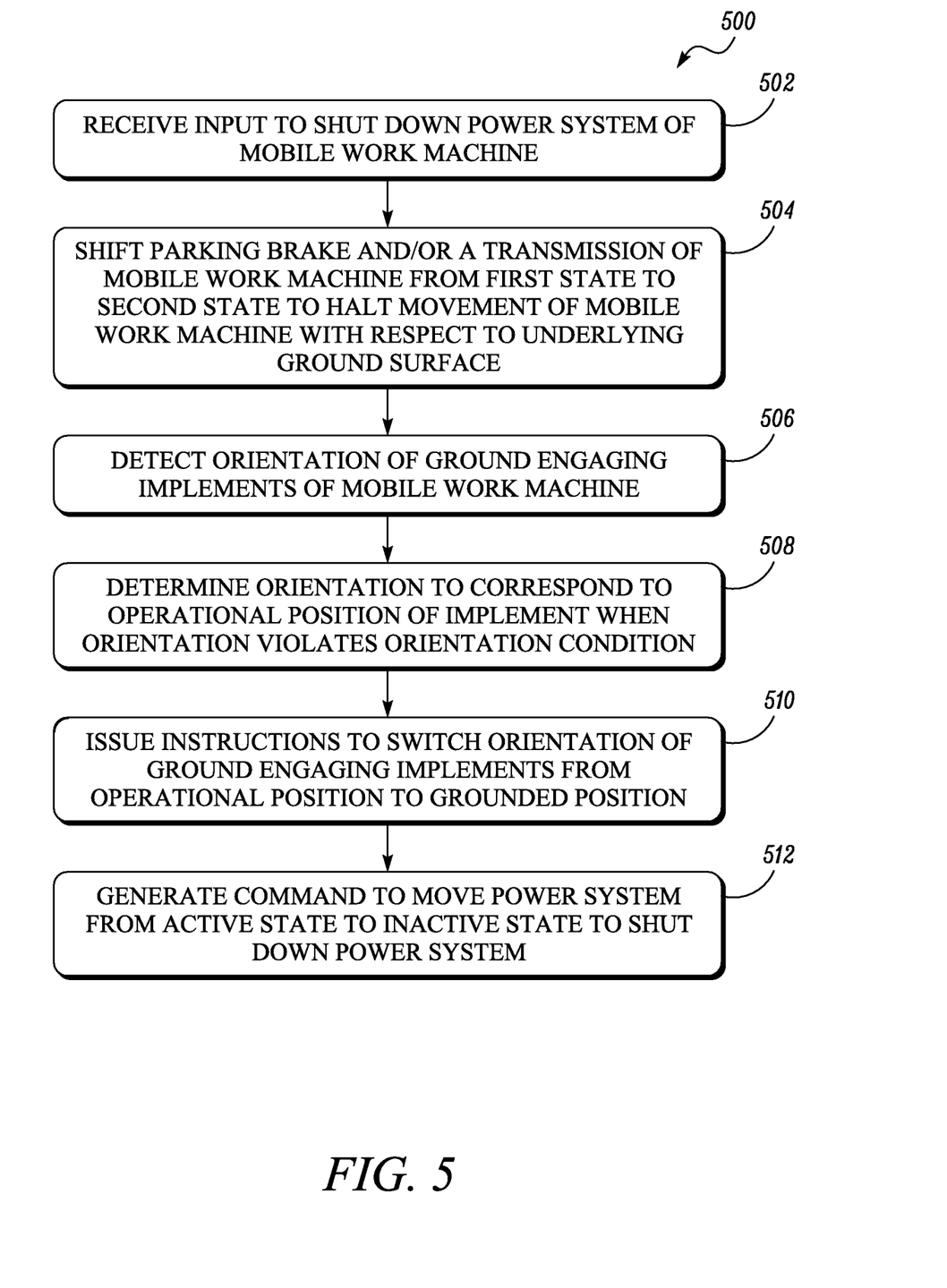
FIG. 5 is a flow chart depicting another exemplary method for operating exemplary motor grader of FIG. 1, in accordance with an embodiment of the present disclosure.

Referring to FIG. 5, an exemplary method for shutting down a power system of a mobile work machine 100 is now discussed. The method is discussed by way of a flowchart 500. It will be appreciated that the order of steps described in the method is exemplary in nature and that the steps can be performed in a different order than what is set out below, as will be contemplated by a person skilled in the art based on the description of the present disclosure.

The method begins with receiving, by the controller 304, an input to shut down the power system 104 of the mobile work machine 100, at block 502. The input to shut down the power system 104 may correspond to the operator turning an ignition button/switch to the OFF position to shut down the power system 104 of the mobile work machine 100. At block 504, the method includes shifting, by the controller 304, the parking brake 258 and/or the transmission 254 of the mobile work machine 100 from the first state to the second state in response to the input to halt a movement of the mobile work machine 100 with respect to the underlying ground surface 102. At block 506, the method includes detecting, by the sensors 308, the orientation of the ground engaging implement 200 of the mobile work machine 100 in response to the input. At block 508, the method includes determining, by the controller 304, the orientation to correspond to an operational position of the ground engaging implement 200 when the orientation violates an orientation condition. The orientation condition may correspond to a state of the ground engaging implement 200 in which the mobile work machine 100 (e.g., the motor grader 100') can be safely parked.

At block 510, the method includes issuing, by the controller 304, one or more instructions to switch the orientation of the ground engaging implement 200 from the operational position to the grounded position. The orientation of the ground engaging implement 200 may be switched from the operational position to the grounded position, by controlling (e.g., actuating) the actuators 148, via the controller 304. In an example, the ground engaging implement 200 (e.g., the blade 182) is moved to its grounded position such that the ground engaging implement 200 occupies a position (tucked-in position) within the width "W" defined by the frame 122 of the motor grader 100'. In some embodiments, the method includes lowering, via the controller 304, the ground engaging implement 200 towards the underlying ground surface 102 to move the ground engaging implement 200 to its corresponding grounded position.

At block 512, the method includes generating, by the controller 304, a command to move the power system 104 from the active state to the inactive state to shut down the power system 104 upon the parking brake 258 and/or the transmission 254 attaining the second state and upon the orientation of the ground engaging implement 200 attaining the grounded position. In some embodiments, the method includes moving, by the controller 304, the power system 104 from the active state to the inactive state to shut down the power system 104 upon the parking brake 258 and/or the transmission 254 attaining the second state and upon the orientation of the ground engaging implement 200 attaining the grounded position. In an example, moving the power system 104 from the active state to the inactive state includes disconnecting a battery of the power system 104 from one or more power units of the mobile work machine 100.

In some embodiments, the method further includes determining, by the controller 304, the pitch of the mobile work machine 100. The method further includes issuing, by the controller 304, one or more instructions to chock one or more wheels 106 of the mobile work machine 100 if the pitch of the mobile work machine 100 exceeds the pitch threshold. In some embodiments, the method further includes detecting one or more obstacles around the motor grader 100, based on information from the sensors 308. In such a scenario, the method includes issuing, by the controller 304, one or more alerts in response to the detection of the one or more obstacles prior to generating the command and prior to issuing the one or more instructions. In some embodiments, the method may include providing an alert and require the operator to acknowledge that no obstacle is present around the mobile work machine 100. In some embodiments, the method includes using, by the controller 304, the output device 312 to provide at least one of the first alert (discussed above) in response to the one or more instructions and the second alert (discussed above) in response to the command.

Figure 6:
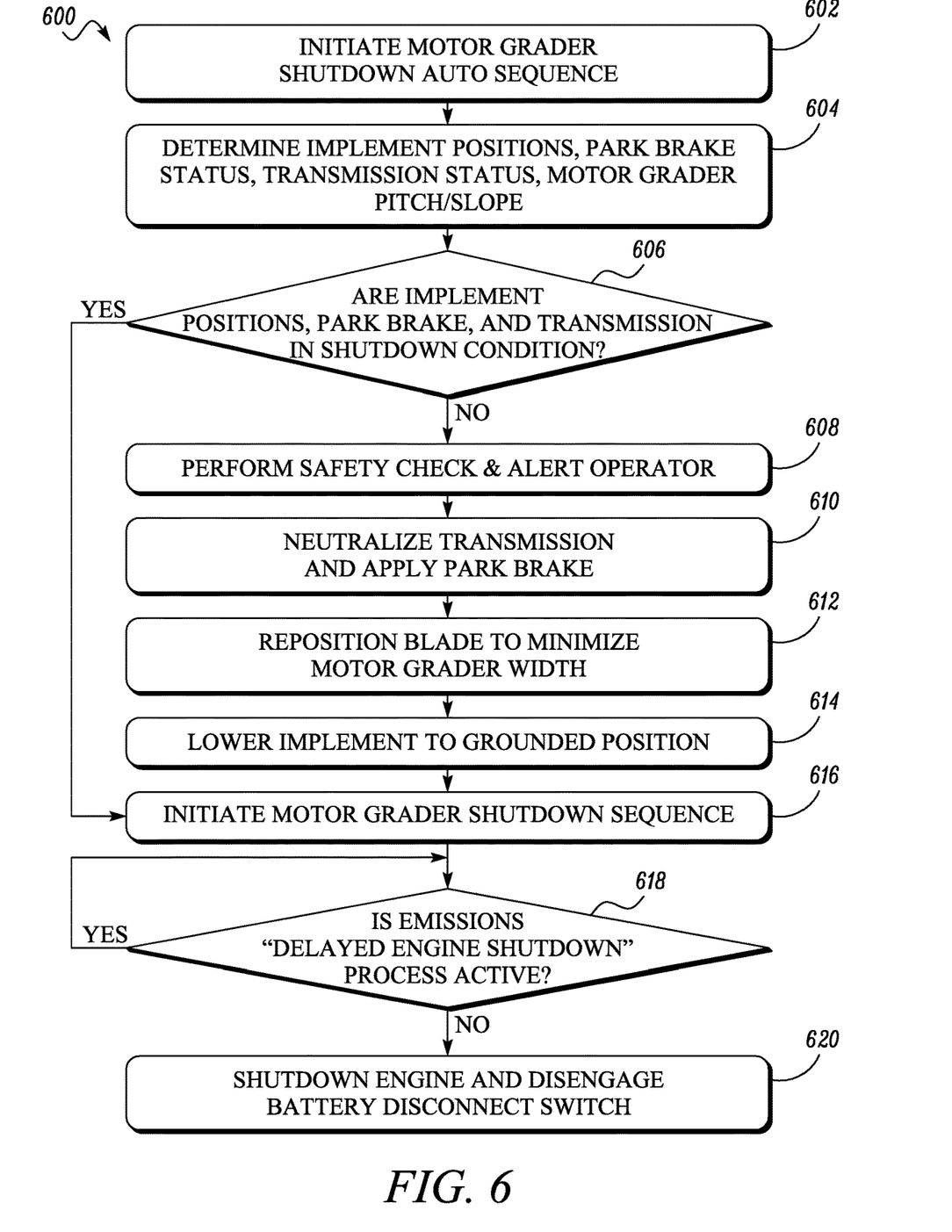
FIG. 6 is a flow chart depicting yet another exemplary method for operating exemplary motor grader of FIG. 1, in accordance with an embodiment of the present disclosure.

Referring to FIG. 6, an exemplary method for shutting down the motor grader 100' including electro-hydraulic ground engaging implements 200 which are capable of automatic control is discussed. The method is discussed by way of a flowchart 600. It will be appreciated that the order of steps described in said method is exemplary in nature and that the steps can be performed in a different order than what is set out below, as will be contemplated by a person skilled in the art based on the description of the present disclosure.

The method begins with initiating the motor grader 100' shutdown auto sequence, at block 602. At block 604, the method includes determining position of the ground engaging implement 200, status of the parking brake 258, status of the transmission 254, and/or pitch of the motor grader 100', for example, via corresponding sensors of the one or more sensors 308. At block 606, the method includes determining whether the position of the ground engaging implement 200, the status of the parking brake 258, and the status of the transmission 254 are in a safe shutdown condition. In an example, the safe shutdown condition may correspond to the ground engaging implement 200 being in the grounded position, the parking brake 258 being applied and/or the transmission 254 being in the neutral position. If the ground engaging implement 200, parking brake 258, transmission 254 are in the safe shutdown condition, the method proceeds to block 616 to initiate motor grader shutdown sequence.

However, if any one of the ground engaging implement 200, parking brake 258, or transmission 254 does not meet the safe shutdown condition, the method proceeds to block 608. At block 608, the method includes performing a safety check and alerting the operator by the controller 304. For example, performing the safety check may include detecting one or more obstacles around the motor grader 100'. In some embodiments, the method includes detecting the obstacles around the motor grader 100', based on information received from cameras 272. Upon detection of the obstacles, the method includes alerting the operator that the obstacles around the motor grader 100' need to be removed.

At block 610, the method includes shifting the transmission 254 to neutral and applying the parking brake 258. To this end, the controller 304 may send signals to a transmission ECM (associated with the transmission 254) to shift the transmission to the neutral position, and may send signals to a brake ECM (associated with the parking brake 258) to move the parking brake to its braked position. At block 612, the method includes repositioning the blade 182 in a "tucked in" position (see FIG. 2). In some embodiments, the blade 182 may be repositioned, by using the actuator 148, such that the blade 182 occupies a position within the width 'W' defined by the frame 122 of the motor grader 100. At block 614, the method includes lowering the ground engaging implement 200 to the grounded position, by using the actuators 148, via the controller 304. Once the transmission 254 is shifted to neutral, the parking brake 258 is moved to its braking position, and the ground engaging implement 200 is moved to its grounded position, the method includes initiating the motor grader shutdown process, at block 616.

Next, at block 618, the method includes checking, via the controller 304, whether an emission delayed engine (power system 104) shutdown (DES) process active or not. "Delayed engine shutdown" may be defined as running the engine after key-off at idle speeds with little to no-load and all regenerative emissions components off to allow exhaust streams to bring the emissions system temperature down to safe shutdown temperatures. If the emission DES process is active, the method includes waiting for the emission DES process to stop. Further if the emission DES process is inactive, the method includes shutting down the power system 104. In some embodiments, the method includes moving, by the controller 304, the power system 104 from the active state to the inactive state to shut down the power system 104. In some embodiments, moving the power system 104 from the active state to the inactive state includes disconnecting the battery of the power system 104 from one or more power units of the motor grader 100. In some embodiments, the method may include disengaging a battery disconnect switch to disconnect the battery of the power system 104 from one or more power units of the motor grader 100.

Figure 7:
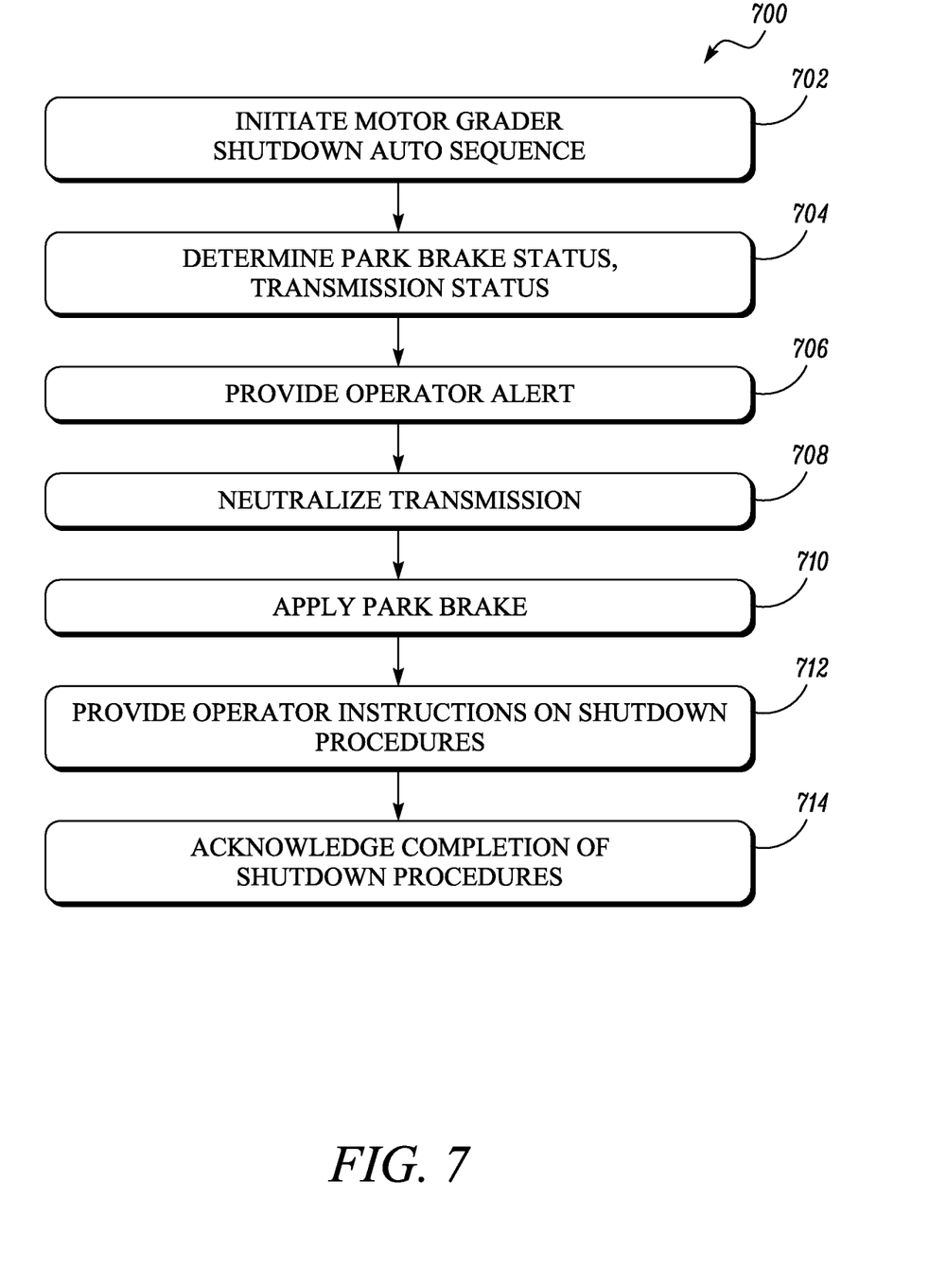
FIG. 7 is a flow chart depicting yet another exemplary method for operating exemplary motor grader of FIG. 1, in accordance with an embodiment of the present disclosure.

Referring to FIG. 7, an exemplary method for shutting down the motor grader 100' including manual hydraulic ground engaging implements 200 which are not capable of automatic control is discussed. The method is discussed by way of a flowchart 700. It will be appreciated that the order of steps described in said method is exemplary in nature and that the steps can be performed in a different order than what is set out below, as will be contemplated by a person skilled in the art based on the description of the present disclosure.

The method begins with initiating the motor grader 100' shutdown auto sequence, at block 702. At block 704, the method includes determining status of the parking brake 258 (for e.g., via brake ECM, or sensors) and status of the transmission 254 (for example, via transmission ECM, or sensors). At block 706, the method includes performing a safety check and alerting the operator by the controller 304. For example, performing the safety check may include detecting one or more obstacles around the motor grader 100'. In some embodiments, the method includes detecting the obstacles around the motor grader 100', based on information from the cameras 272. In such a scenario, the method includes alerting the operator that the obstacles around the motor grader 100' need to be removed.

At block 708, the method includes shifting the transmission 254 to neutral. The transmission 254 may be shifted to neutral by the operator. At block 710, the method includes applying the parking brake 258. The parking brake 258 may be applied (or engaged) by the operator. At block 712, the method includes providing instructions on shutdown procedures to the operator for shutting down the motor grader 100'. The shutdown procedures include repositioning the implement 200 (e.g., the blade 182) to its "tucked in" position (see FIG. 2). In some embodiments, the blade 182 may be repositioned such that the blade 182 occupies a position within the width 'W' defined by the frame 122 of the motor grader 100.

The shutdown procedures further include lowering the ground engaging implements 200 to the grounded position, by actuating the actuators 148 in a suitable manner. In some embodiments, the shutdown procedures may include chocking the wheels 106, 106" if the pitch of the motor grader exceeds the pitch threshold. In some embodiments, the shutdown procedures may include disconnecting the battery from the one or more power units of the motor grader after motor grader 100' shutdown. At block 714, the method further includes acknowledging the completion of the shutdown procedures by the operator. In some embodiments, acknowledging the completion of the shutdown procedures may include moving the ignition button/switch (of the motor grader 100') to an "override" position. In some embodiments, acknowledging the completion of the shutdown procedures may be performed by the operator via a switch or a display. In some embodiments, the method may include logging an event if the operator has not acknowledged completion of the shutdown procedures via telematics to a back office.

The method and system 300 of the present disclosure allows the mobile work machine 100 (motor grader 100") to be parked safely at the end of the work cycle or the operation of the mobile work machine 100. For example, even if the operator of the mobile work machine 100 is new and neglects to follow a specific shutdown procedure, the controller 304 would not allow the power system 104 of the mobile work machine 100 to move to an inactive state until all the conditions for shutting down the mobile work machine 100 are met. For example, the controller 304 would not allow the power system 104 of the mobile work machine 100 to move to an inactive state until the transmission 254 is in a neutral position, the parking brake 258 is engaged and all the ground engaging implements 200 are in a grounded position. Thus, the method and system 300 allow the mobile work machine to be parked safely, thereby improving the life of one or more components of the mobile work machine 100 and avoiding any accident of the mobile work machine.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A method to shutdown a motor grader, the method comprising:
   obtaining information that indicates the motor grader is to be shutdown;
   causing, based on the indication that the motor grader is to be shutdown, a parking brake of the motor grader to be in a braked position;
   causing, based on the indication that the motor grader is to be shutdown, a transmission of the motor grader to be in a neutral position;
   detecting, based on information from one or more sensors of the motor grader, whether an implement, of one or more ground engaging implements of the motor grader, is not in a grounded position;
   causing, based on detecting that the implement is not in the grounded position and based on the indication that the motor grader is to be shutdown, the implement to be moved to the grounded position; and
   at least one of:
      causing, via a controller of the motor grader and based on the parking brake being in the braked position, the transmission being in the neutral position, and the implement being in the grounded position, the motor grader to be shutdown; or
      causing, via the controller of the motor grader and based on the indication that the motor grader is to be shutdown, an alert to be provided in an operator cab of the motor grader, wherein the alert includes information that, to complete the shutdown of the motor grader, the parking brake is to be in the braked position, the transmission is to be in the neutral position; and the implement is to be moved to the grounded position.

2. The method of claim 1, wherein the motor grader is shutdown via the controller.

3. The method of claim 2, further comprising:
   determining, based on information from the one or more sensors, whether the parking brake is in the braked position; and
   causing, via the controller and based on the indication that the motor grader is to be shutdown and that the parking brake is not in the braked position, the parking brake to be moved to the braked position.

4. The method of claim 2, further comprising:
   determining, based on information from the one or more sensors, whether the transmission is in the neutral position; and
   causing, via the controller and based on the indication that the motor grader is to be shutdown and that the transmission is not in the neutral position, the transmission to be shifted to the neutral position.

5. The method of claim 1 wherein causing the motor grader to be shutdown includes moving a power system of the motor grader from an active state to an inactive state,
   wherein moving the power system from the active state to the inactive state includes disconnecting a battery of the power system from one or more power units of the motor grader.

6. The method of claim 1 wherein causing the implement to be moved to the grounded position includes:
   using, via the controller, one or more actuators to move the implement to the grounded position.

7. The method of claim 6, wherein using the one or more actuators to move the implement to the grounded position includes:
   moving, via the controller, the implement such that the implement occupies a position within a width defined by a frame of the motor grader; and
   lowering, via the controller, the implement towards an underlying ground surface.

8. The method of claim 1, wherein the alert is provided in the operator cab of the motor grader.

9. The method of claim 8, further comprising:
   determining, based on information from the one or more sensors, whether the parking brake is in the braked position,
      wherein, when the parking brake is not in the braked position, the alert includes information that the parking brake needs to be moved to the braked position.

10. The method of claim 8, further comprising:
    determining, based on information from the one or more sensors, whether the transmission is in the neutral position,
       wherein, when the transmission is not in the neutral position, the alert includes information that the transmission needs to be moved to the neutral position.

11. The method of claim 8, further comprising:
    determining, based on information from the one or more sensors, a pitch of the motor grader, wherein, when the pitch exceeds a pitch threshold, the alert includes information that one or more wheels of the motor grader need to be chocked.

12. The method of claim 8, further comprising:
detecting, based on information from the one or more sensors, one or more obstacles around the motor grader; and
wherein, when the one or more obstacles are detected, the alert includes information that one or more obstacles around the motor grader need to be removed.

13. A system for shutting down a motor grader, the system comprising:
one or more sensors associated with the motor grader, wherein
an implement, of one or more ground engaging implements of the motor grader, is movable to a grounded position based on an indication that the motor grader is to be shutdown and based on detecting, via the one or more sensors, that the implement is not in the grounded position, and
based on the indication that the motor grader is to be shutdown, a parking brake of the motor grader is movable to a braked position and a transmission of the motor grader is movable to a neutral position; and
a controller associated with the motor grader, the controller configured to at least one of:
cause, based on the parking brake being in the braked position, the transmission being in the neutral position, and the implement being in the grounded position, the motor grader to be shutdown; or
cause, based on the indication that the motor grader is to be shutdown, an alert to be provided in an operator cab of the motor grader, wherein the alert includes information that, to complete the shutdown of the motor grader, the parking brake is to be in the braked position, the transmission is to be in the neutral position, and the implement is to be moved to the grounded position.

14. A method for shutting down a power system of a mobile work machine, the method comprising:
receiving, by a controller, an input to shut down the power system;
shifting, by the controller, a parking brake and/or a transmission of the mobile work machine from a first state to a second state in response to the input to halt a movement of the mobile work machine with respect to an underlying ground surface;
detecting, by one or more sensors, an orientation of an implement, of one or more ground engaging implements of the mobile work machine in response to the input;
determining, by the controller, the orientation to correspond to an operational position of the implement, of the one or more ground engaging implements when the orientation violates an orientation condition;
issuing, by the controller, one or more instructions to switch the orientation of the implement, of the one or more ground engaging implements from the operational position to a grounded position; and
generating, by the controller, a command to move the power system from an active state to an inactive state to shut down the power system upon the parking brake and/or the transmission attaining the second state and upon the orientation of the implement, of the one or more ground engaging implements attaining the grounded position.

15. The method of claim 14, further comprising:
determining, by the controller, a pitch of the mobile work machine; and
issuing, by the controller, one or more instructions to chock one or more wheels of the mobile work machine if the pitch of the mobile work machine exceeds a pitch threshold.

16. The method of claim 15, further comprising:
detecting, by the one or more sensors, one or more obstacles around the mobile work machine; and
issuing, by the controller, one or more alerts in response to the detection of the one or more obstacles prior to generating the command and prior to issuing the one or more instructions.

17. The method of claim 14, further comprising:
using, by the controller, one or more actuators to switch the orientation of the implement, of the one or more ground engaging implements from the operational position to the grounded position in response to the one or more instructions.

18. The method of claim 14, further comprising:
moving, by the controller, the power system from the active state to the inactive state to shut down the power system upon the parking brake and/or the transmission attaining the second state and upon the orientation of the implement, of the one or more ground engaging implements attaining the grounded position, and wherein moving the power system from the active state to the inactive state includes disconnecting a battery of the power system from one or more power units of the mobile work machine.

19. The method of claim 14, further comprising:
using, by the controller, an output device to provide at least one of a first alert in response to the one or more instructions and a second alert in response to the command.

20. The method of claim 17, wherein using the one or more actuators to switch the orientation of the implement, of the one or more ground engaging implements from the operational position to the grounded position includes:
moving, by the controller, the implement, of the one or more ground engaging implements such that the implement, of the one or more ground engaging implements occupies a position within a width defined by a frame of the mobile work machine; and
lowering, by the controller, the implement, of the one or more ground engaging implements towards the underlying ground surface.

\* \* \* \* \*